(12) United States Patent
Scheck

(10) Patent No.: US 8,061,460 B2
(45) Date of Patent: Nov. 22, 2011

(54) STAIR CLIMBING DEVICE

(75) Inventor: Franz Scheck, Balingen (DE)

(73) Assignee: Ulrich Alber GmbH, Albstadt-Tailfingen (DE)

( * ) Notice: Subject to any disclaimer, the term of this patent is extended or adjusted under 35 U.S.C. 154(b) by 0 days.

(21) Appl. No.: 12/548,028

(22) Filed: Aug. 26, 2009

(65) Prior Publication Data
US 2010/0062907 A1   Mar. 11, 2010

(30) Foreign Application Priority Data

Sep. 11, 2008   (DE) .......................... 10 2008 044 516

(51) Int. Cl.
*B62B 5/02*   (2006.01)
*A61G 5/06*   (2006.01)

(52) U.S. Cl. .......................................... 180/8.1; 280/5.2

(58) Field of Classification Search ............ 180/8.1–8.7, 180/65.1, 65.31, 65.6, 907; 280/5.2, 5.22, 280/5.26, 5.28, 5.3, 5.32, 250.1, DIG. 10
See application file for complete search history.

(56) References Cited

U.S. PATENT DOCUMENTS

| | | | | |
|---|---|---|---|---|
| 3,198,534 | A * | 8/1965 | Porter | 280/5.22 |
| 3,304,094 | A * | 2/1967 | Wenger | 280/5.2 |
| 3,930,551 | A * | 1/1976 | Cragg | 180/65.6 |
| 4,550,924 | A * | 11/1985 | Alber | 280/5.28 |
| 4,790,548 | A * | 12/1988 | Decelles et al. | 280/5.26 |
| 4,993,912 | A * | 2/1991 | King et al. | 414/729 |
| 5,263,547 | A * | 11/1993 | Alber | 180/8.2 |
| 5,579,857 | A * | 12/1996 | Abe et al. | 180/8.2 |
| 6,003,624 | A * | 12/1999 | Jorgensen et al. | 180/6.5 |
| 6,164,398 | A * | 12/2000 | Alber | 180/8.2 |
| 6,328,120 | B1 * | 12/2001 | Haussler et al. | 180/8.3 |
| 6,336,642 | B1 * | 1/2002 | Carstens | 280/5.22 |
| 6,386,552 | B1 * | 5/2002 | Bierma | 280/5.28 |
| 6,484,829 | B1 * | 11/2002 | Cox | 180/8.1 |

(Continued)

FOREIGN PATENT DOCUMENTS

DE         19912932 C1       3/1999

(Continued)

OTHER PUBLICATIONS

Office Action Report; JP App. No. 2009-208945; issued Mar. 9, 2010.

*Primary Examiner* — J. Allen Shriver, II
*Assistant Examiner* — Travis Coolman
(74) *Attorney, Agent, or Firm* — Novak Druce + Quigg LLP

(57) ABSTRACT

A stair climbing device, adapted for a wheel chair, including at least one climbing element which is adapted to be moved on a circular path so that it can get in contact with the next step of a stair and lift or lower the stair climbing device on the next step. The stair climbing device includes a drive motor for providing a driving force for moving the at least one climbing element on the circular path, wherein the movement of the at least one climbing element on the circular path is carried out with a non-constant rotational speed. A gear transmission assembly is provided between the drive motor and the at least one climbing element which gear transmission assembly is adapted to cyclically vary the rotational speed of the at least one climbing element with respect to the rotational speed of the drive motor.

11 Claims, 14 Drawing Sheets

U.S. PATENT DOCUMENTS

| | | | |
|---|---|---|---|
| 6,752,400 B2 * | 6/2004 | Nakatsukasa et al. | 280/5.2 |
| 6,805,209 B2 * | 10/2004 | Hedeen | 180/9.32 |
| 6,857,490 B2 * | 2/2005 | Quigg | 180/9.28 |
| 6,935,447 B2 * | 8/2005 | Bierma | 180/8.2 |
| 7,316,405 B2 * | 1/2008 | Kritman et al. | 280/5.22 |
| 7,384,046 B2 * | 6/2008 | Le Masne De Chermont | 280/5.2 |
| 7,422,079 B2 * | 9/2008 | Hsiao | 180/65.1 |
| 7,475,745 B1 * | 1/2009 | DeRoos | 180/9.34 |
| 7,654,348 B2 * | 2/2010 | Ohm et al. | 180/9.32 |
| 2003/0051568 A1 * | 3/2003 | Liao | 74/376 |
| 2006/0145433 A1 * | 7/2006 | Kim | 280/5.28 |
| 2008/0093131 A1 * | 4/2008 | Couture et al. | 180/9.1 |

FOREIGN PATENT DOCUMENTS

| | | |
|---|---|---|
| DE | 29721477 U1 | 6/1999 |
| DE | 102004043778 A1 | 4/2005 |
| JP | 7228259 | 8/1995 |
| WO | 0012371 A1 | 3/2000 |

\* cited by examiner

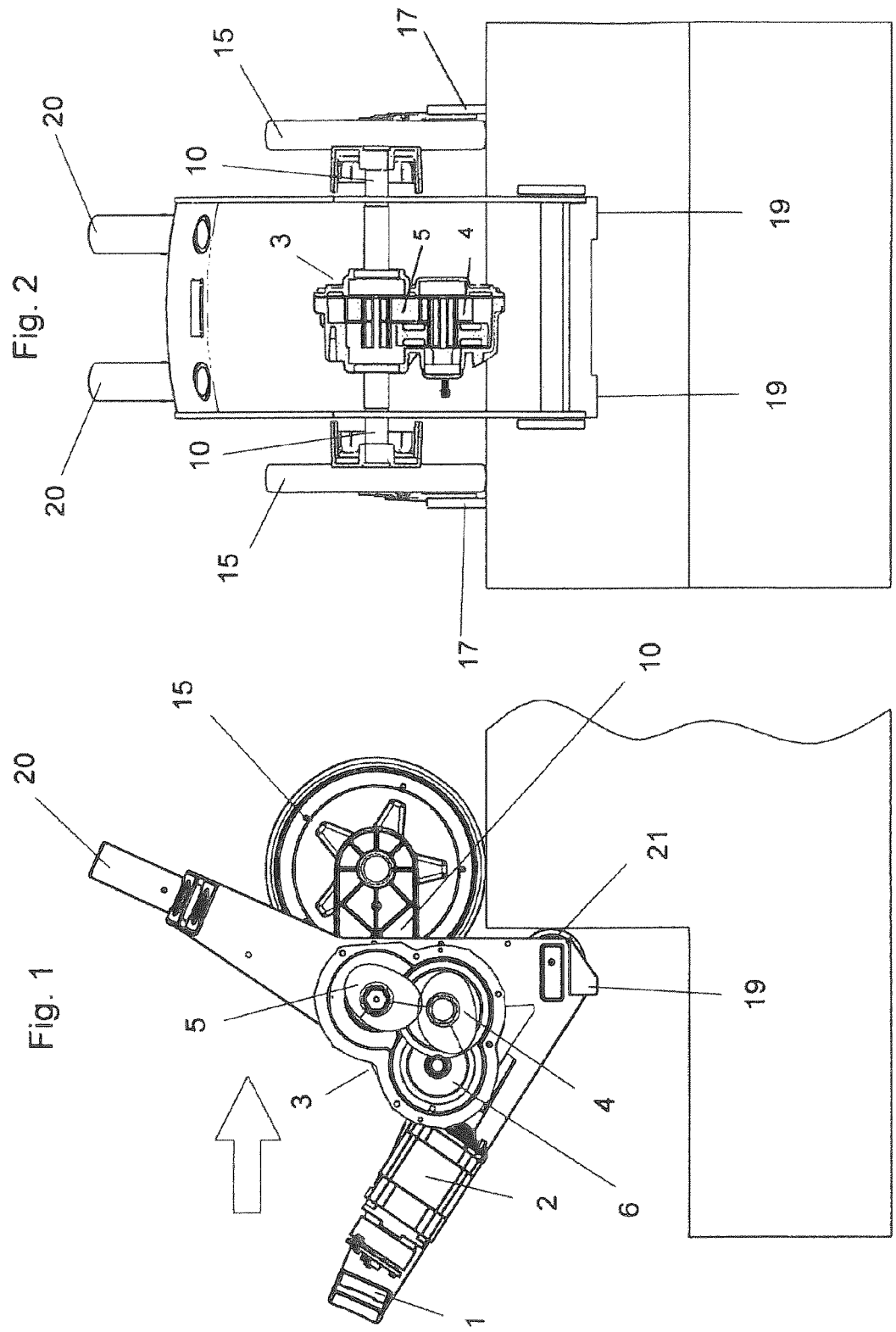

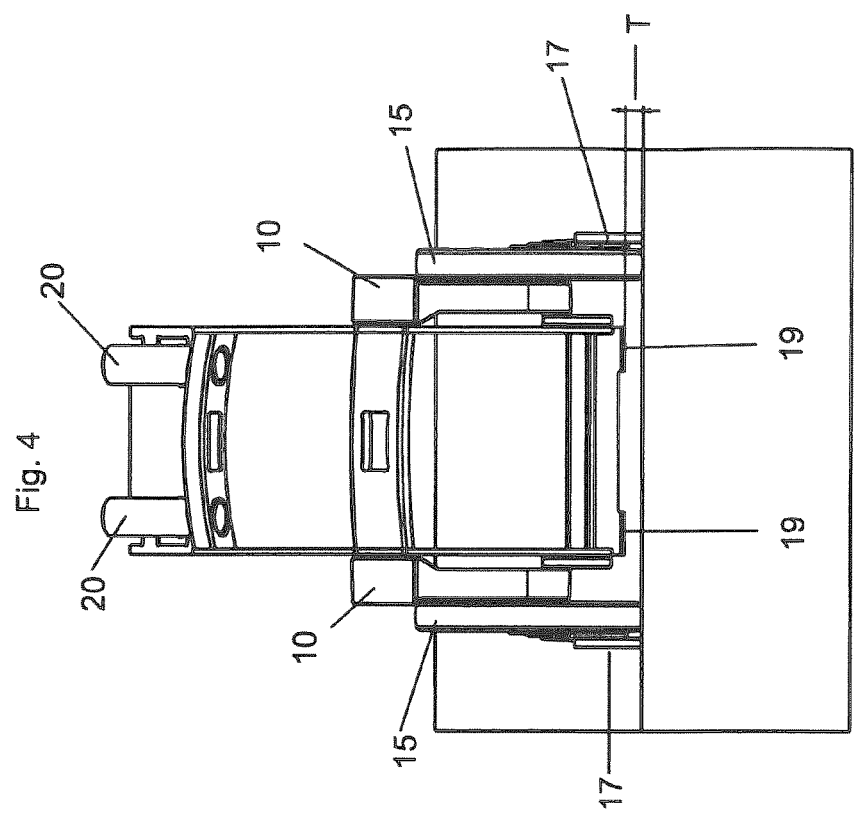
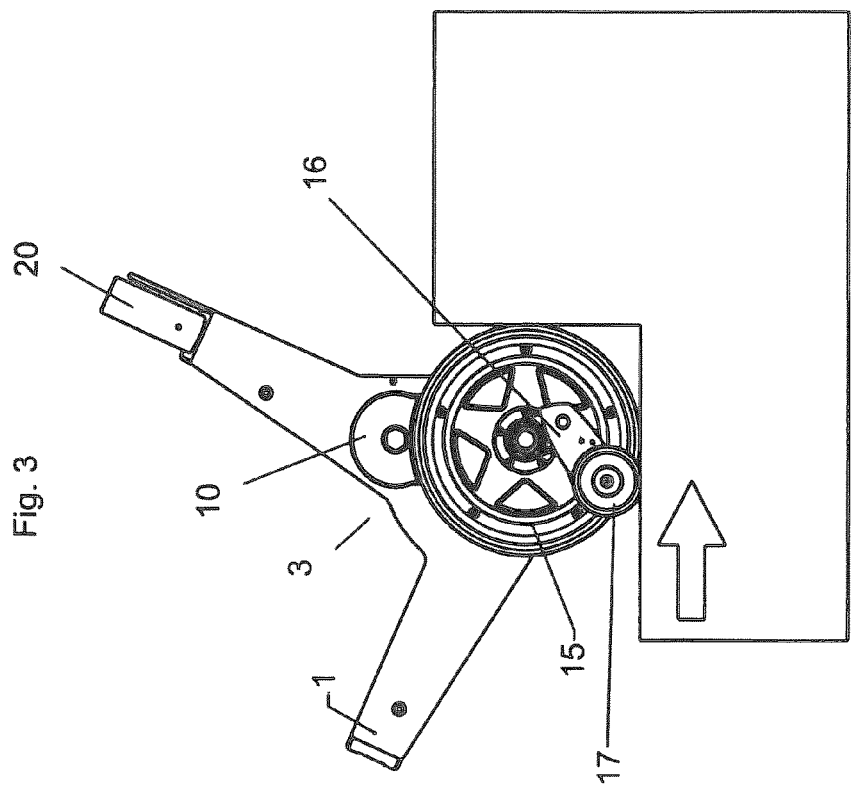

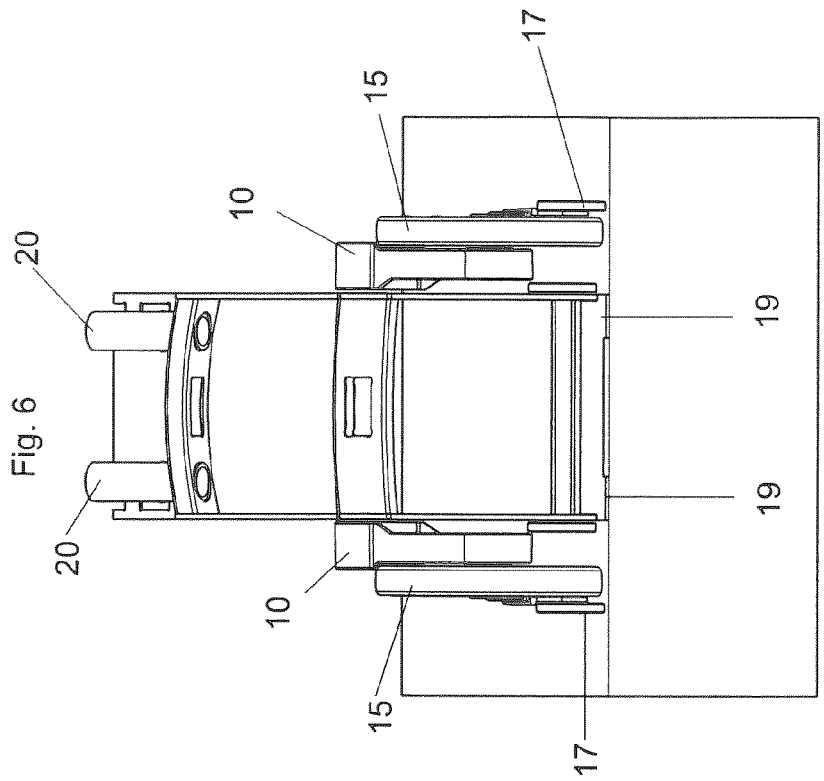
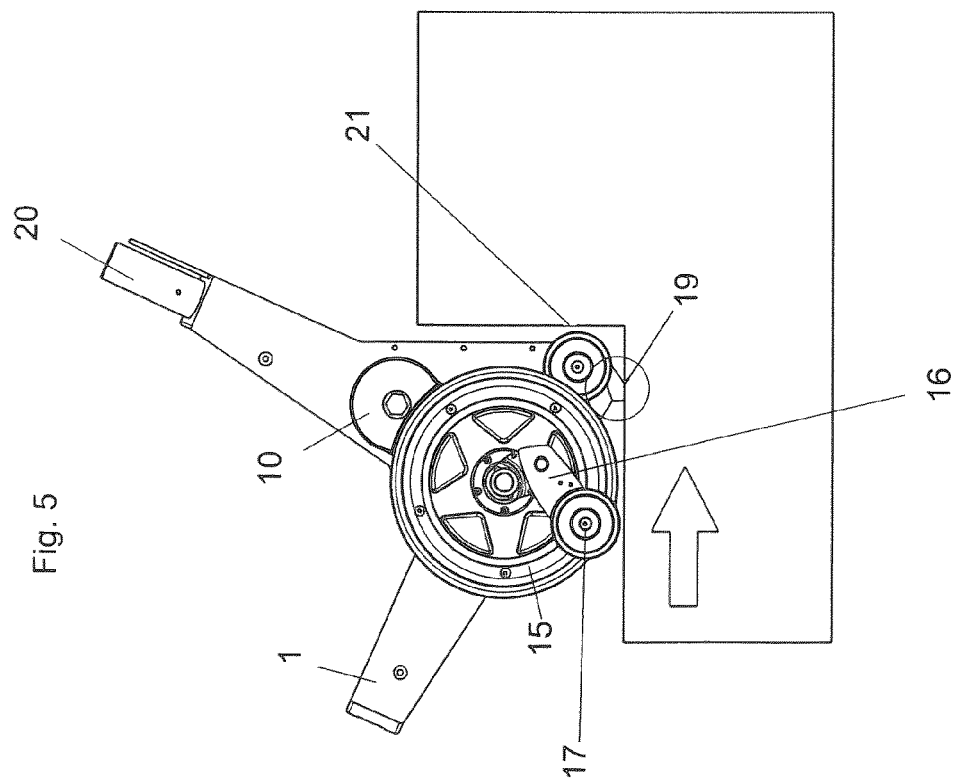

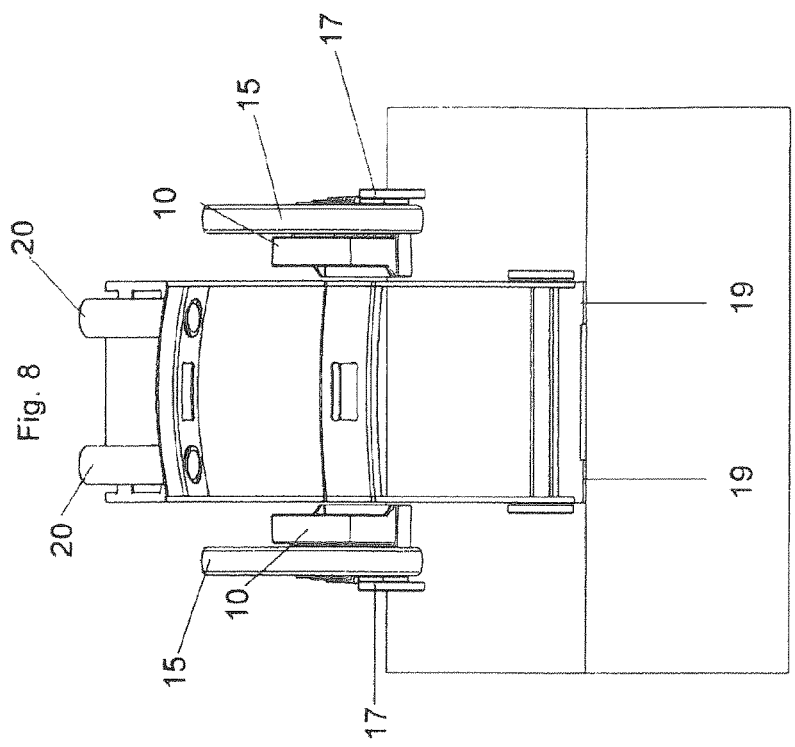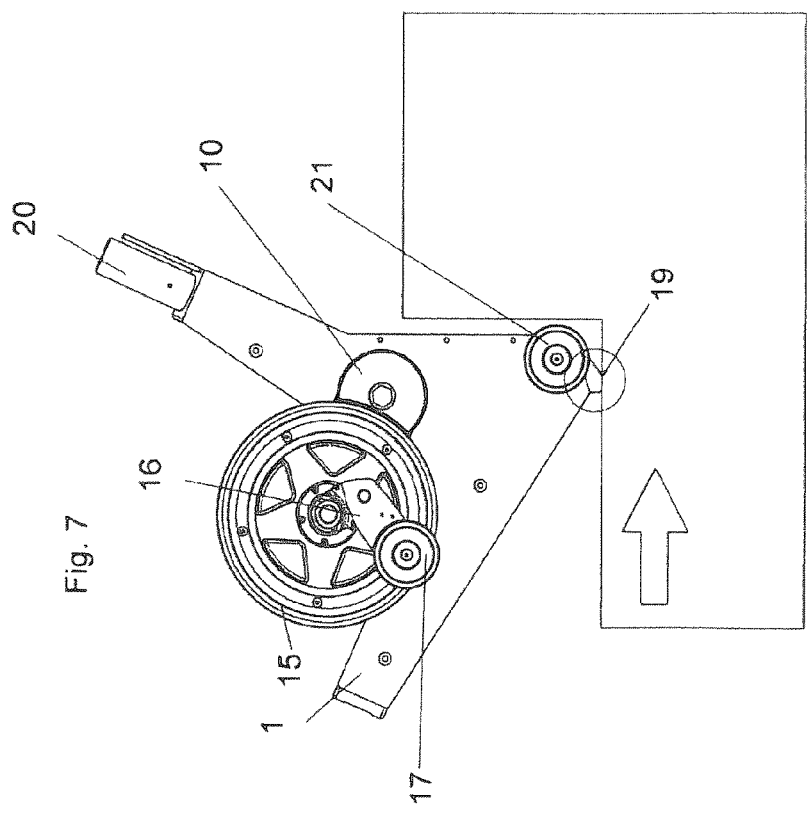

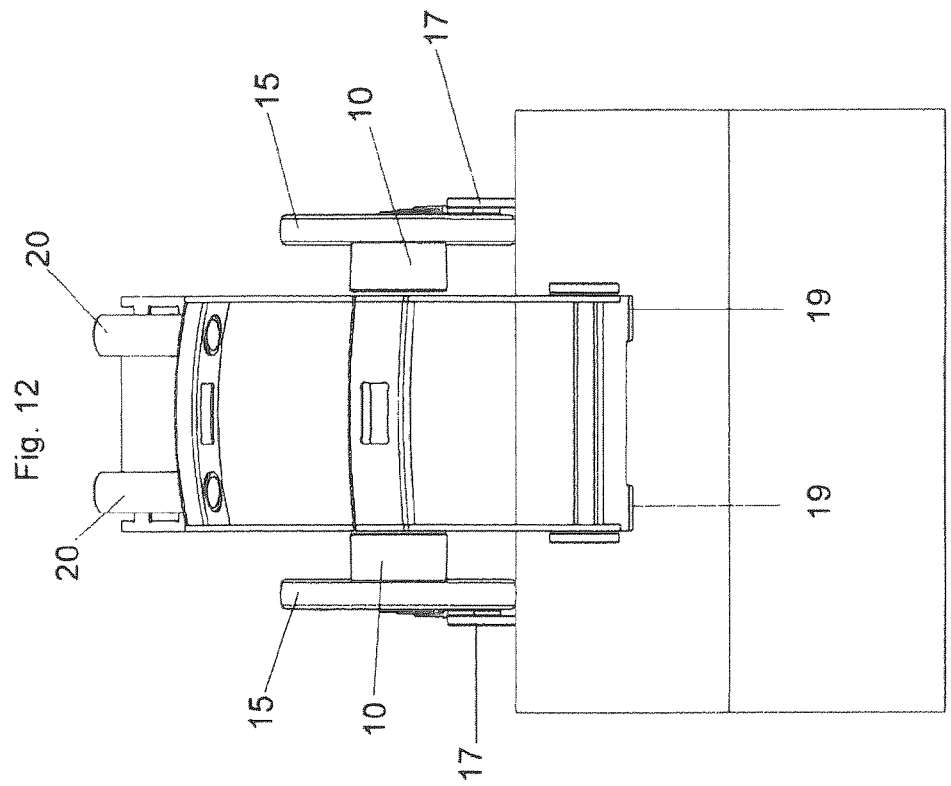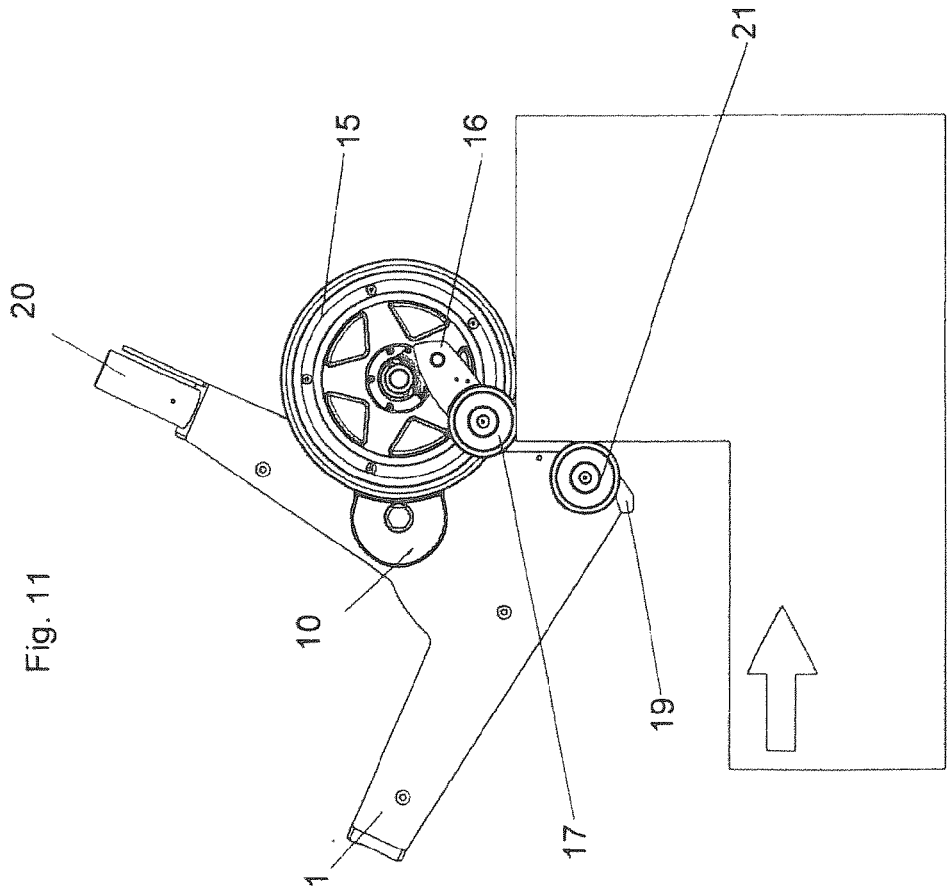

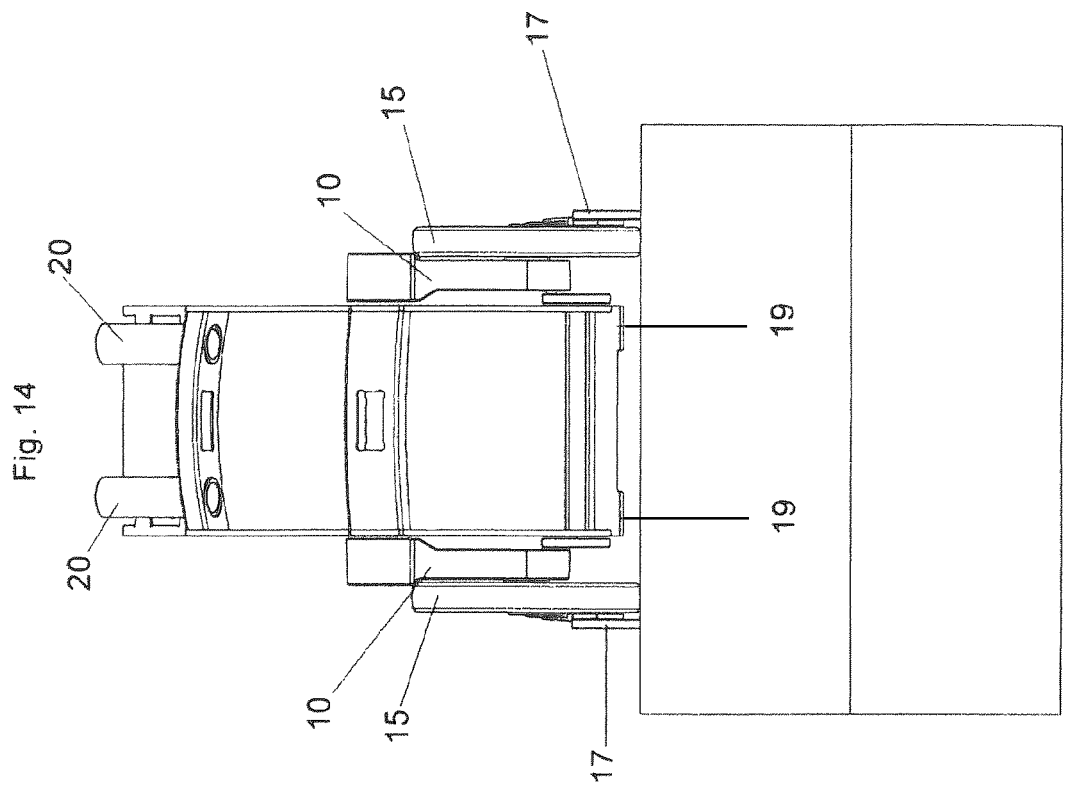
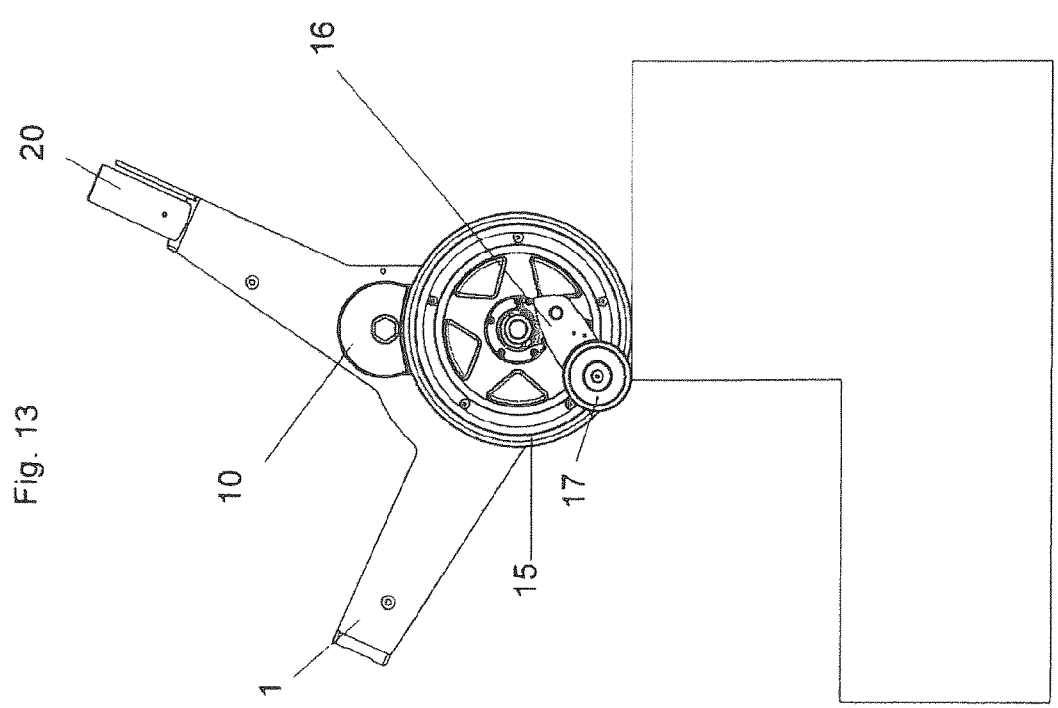

Cardan joint

Linkage gear assembly

STAIR CLIMBING DEVICE

CROSS-REFERENCE TO RELATED APPLICATIONS

The present application claims priority to German Patent Application DE 10 2008 044 516.9 filed Sep. 11, 2008. Said application is hereby incorporated by reference in its entirety.

FIELD OF THE INVENTION

The present disclosure relates to a stair climbing device having at least one climbing element which can be moved on a circular path so that the element can get in contact with the next step of a stair and lift or lower the stair climbing device on the next step.

BACKGROUND OF THE INVENTION

Stair climbing devices are suitable for the transport of devices, goods and persons and particularly of wheel chairs for moving the wheelchair together with a person sitting therein. The stair climbing device can be detachably mounted to such a wheelchair. However, stair climbing devices can also be fixedly integrated as a climbing unit in a wheel chair or another means of transportation for persons or goods. Examples for various embodiments of such stair climbing devices are for instance presented in DE 297 21 477 U1, DE 10 2004 043 778 A1 or WO 00/12371 A1.

Stairs constitute a considerable problem particularly for wheel chair drivers and people with impaired mobility. A stair climbing device as mentioned above, for example, provides the possibility that an assisting person can transport a wheel chair driver or a person with impaired mobility upstairs or downstairs without particular physical effort merely with the assistance of such a stair climbing device. In order to achieve this, such a stair climbing device can be detachably mounted to a wheel chair, provided that the stair climbing device is not designed as a part of the wheel chair as such. Together with the wheel chair the stair climbing device is driven to the first step of a flight of stairs. An assisting person tilts the stair climbing device together with the attached wheel chair towards his or her direction in a position of balance. When the ideal tilting position is reached, the assisting person only feels a minimum force in a forward or rear direction. When a climbing element of the stair climbing device gets in contact with the closest step in order to lift the stair climbing device on this next step, a load change reaction takes place which has to be compensated by the assisting person. The faster and stronger this load change reaction is, the stronger must be the reaction and corresponding compensation action of the assisting person.

In order to facilitate handling of such a stair climbing device, DE 199 12 932 C1 being a document of the generic kind suggests that the climbing unit of the stair climbing device is operated with varying propulsion speeds, wherein the propulsion speed shortly before contact of a climbing element on the next step is reduced as compared with a first predetermined propulsion speed so that a soft touchdown is achieved and after the touchdown on the next step the propulsion speed is increased again in order to effect the climbing action as a whole in a speedy manner. Due to the soft touchdown on the respective step, the handling of load change reactions by the assisting person is considerably facilitated. Furthermore, the climbing procedure is more gentle for the person sitting in the wheel chair.

In this known stair climbing device, the variation of the propulsion speed of the climbing element is carried out electronically by respective control of the drive motor. The drive motor is operated due to the electronic drive control during the climbing cycle with varying speed. This, however, leads to enhanced requirements regarding the electric drive motor.

In order to achieve the desired soft touchdown, the drive motor of the known stair climbing device presented in DE 199 12 932 C1 has to be operated with a rotational speed as low as possible directly prior to touchdown of the climbing element or a lifting element on a step as well as immediately thereafter in order to minimize the load change reaction as mentioned above and to insure a gentle touchdown. This means, however, that due to the start of the lifting action a sudden increase in force and a particularly high requirement of torque is given exactly when the electric driving motor is operating with a low rotational speed and exactly then, when the driving motor due to its design can deliver only a rather low torque. Such an electric motor therefore has to have particularly high torque reserves.

SUMMARY OF THE INVENTION

An object underlying exemplary embodiments disclosed herein is to provide a stair climbing device, for instance for wheel chairs, having at least one climbing element which can be moved on a circular path so that it can get in contact with the next step of a stair and lift or lower the stair climbing device on the next step, said stair climbing device comprising a drive motor for providing a driving force for moving the at least one climbing element on the circular path, wherein the movement of the at least one climbing element on the circular path is carried out with a non-constant rotational speed in such a way that the driving operation is carried out as efficient as possible and, at the same time, user friendly.

A stair climbing device in accordance with exemplary embodiments of the present disclosure comprises a gear transmission assembly which is provided between the drive motor and the at least one climbing element which gear transmission assembly is adapted to cyclically vary the rotational speed of the at least one climbing element with respect to the rotational speed of the drive motor.

The climbing element moves on a circular path so that it can be rotatably supported in a simple and preferred manner at an eccentric arm. In case of the exemplary embodiment, the cyclic variation of the rotational speed of the at least one climbing element is provided by interconnection of a gear transmission assembly which cyclically various the gear transmission ratio. Hence, the drive motor which preferably is implemented as an electric motor can be operate with a constant or at least an essentially constant rotational speed and, still, a cyclic variation of the rotational speed of the climbing element can be achieved. Unwanted peak values of torque in an operational range where the motor cannot deliver its maximum torque are thereby avoided.

Basically, any gear transmission assembly can be used for such non-constant gear transmission as long as it can vary the gear transmission ratio. Preferably, the change of the gear transmission ratio should be continuous and should not be carried out in steps. For instance, this can be achieved by a hydraulic gear assembly, for instance a so-called torque converter transmission and, particularly, by mechanical gear transmission assemblies which are suited for this purpose, for instance a Cardan joint, a linkage gear assembly, a chain gear assembly having non-circular chain wheels, a tooth belt gear assembly having non-circular belt pulleys, a cam-roller star gear assembly or a cam gear assembly.

A particularly preferable exemplary embodiment of the stair climbing device according to the present disclosure has a mechanical gear transmission assembly which is implemented as a gear transmission assembly having non-circular gear wheels, called a non-circular gear transmission assembly. A particularly precise adaptation to a desired gradient of the rotational speed can be achieved if two non-circular gears having different lines of contact or lines of action are used. For economical reasons, however, it is also possible to use two non-circular gear wheels having the same line of contact or line of action. These non-circular gear wheels can be implemented in a mirrored position and off-set to each other, that means that they are implemented having mirror imaged lines of action or lines of contact. This kind of gear transmission assembly is called mirror type. Alternatively, such gear wheels can be installed with respect to each other so that the lines of action or lines of contact are offset by a specific angle. This kind of gear transmission assembly is called twin type.

A fine adjustment of the gradient of the rotational speed to a desired target value can be achieved in that the cyclic variation of the rotational speed of the climbing element achieved by the non-circular gear transmission assembly is superimposed by a cyclic variation of the rotational speed of the drive motor. Since in this case the variation of the rotational speed of the drive motor is considerably lower than in case of the prior art mentioned above, the respective disadvantages are of no consequence.

BRIEF DESCRIPTION OF THE FIGURES

In the following, embodiments are further explained with reference to the accompanying figures, in which:

FIG. 1 is a sectional view of a stair climbing device in a side elevation in accordance with an exemplary embodiment;

FIG. 2 is a front view of the stair climbing device according to FIG. 1 in the same position, wherein the depiction in FIG. 2 is also partly a section view;

FIGS. 3 and 4 are views of the stair climbing device according to FIG. 1, in a side view and front view, in a first position when approaching a step;

FIGS. 5 and 6 are views corresponding to FIGS. 3 and 4, wherein the climbing elements implemented as a wheel are rotated clockwise by about 30° so that the housing rests on the step;

FIGS. 7 and 8 are views corresponding to FIGS. 5 and 6 wherein the wheels are further rotated clockwise with a higher rotational speed and a low driving torque.

FIGS. 11 and 12 are views corresponding to FIGS. 9 and 10 wherein the housing is lifted further up and wherein in this position the highest torque at the lowest rotational speed is given so that the drive motor has to deliver its highest driving torque;

FIGS. 13 and 14 are views corresponding to FIGS. 11 and 12 wherein the housing has arrived at the upper step;

DETAILED DESCRIPTION OF EXEMPLARY EMBODIMENTS

Figure 10:
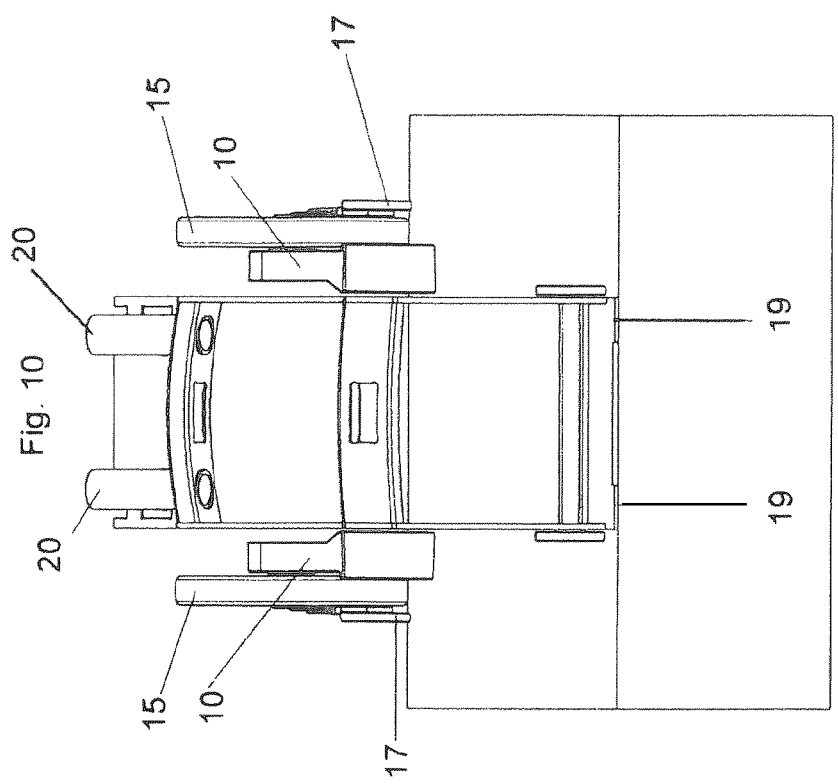
FIGS. 9 and 10 are views corresponding to FIGS. 7 and 8, wherein the wheels now are further rotated with slow rotational speed and high driving torque until they touchdown on the upper step and, now, lift the housing while performing lift work.

FIGS. 1 and 2 show, partially as a sectional view, FIG. 1 in a side elevation and FIG. 2 in a front view, the drive portion of an exemplary embodiment of the present disclosure. Those technical features which are self-understood for a person skilled in the art, particularly fastening means for detachably mounting a stair climbing device to a wheelchair as well as bar ends and operational elements with which a person operating the stair climbing device and assisting the wheelchair driver can handle and operate the stair climbing device are not shown in the figures. In this respect, the figures merely show lower ends of operating bars 20 at the upper ends of which respective handles and operating elements which are not shown can be mounted.

An electric drive motor 2 and a non-circular gear transmission assembly 3 having a driving non-circular gear wheel 4 and a driven non-circular gear wheel 5 are disposed in a housing 1. The torque of the driving motor 2 is delivered via an intermediate gear wheel 6 to the driving non-circular gear wheel 4 which is in engagement with the driven non-circular gear wheel 5. Two eccentric arms 10 are fixedly connected to the driven non-circular gear wheel 5 so that they cannot rotate with respect thereto. Each of the eccentric arms 10 has a climbing element 15 mounted thereto which is implemented as a running wheel 15. Both running wheels 15 are disposed at the outer sides of the stair climbing device so that a stable support is achieved. It is understood that instead of two laterally mounted running wheels 15 it would also be sufficient to provide a centrally arranged single climbing element for carrying out the climbing process.

A break wheel 17 is arranged at each running wheel 15. As known in the art, such break wheel 17 provides that the running wheel 15 is blocked against unintended rotation as long as the break wheel 17 does not have sufficient contact with the floor. This prevents unintended rolling away of the stair climbing device under certain climbing conditions.

As can be taken from the sectional depiction in FIG. 1, upon rotation of the non-circular gear transmission assembly 3, the transmission ratio varies continuously. The operational position which is shown in a lateral view in FIG. 1 and in a front view in FIG. 2 is such that in case of constant rotational speed of the driving motor 2 the highest torque is provided and, accordingly, the output rotational speed has its minimum.

In the following, the climbing process for one step is explained in connection with FIGS. 5 to 14. FIGS. 5 to 14 correspond basically to FIGS. 1 and 2. However, they are not sectional views.

The depictions according to FIGS. 3 and 4 show the stair climbing device approaching a stair. The break wheel 17 and a break lever 16 are in a position in which the running wheel 15 can freely roll. The stair climbing device has a ground clearance T which insures a sufficient gap between two correspondingly designed contact points 19 to a lower step. In order to illustrate the contact of the contact point 19, this is highlighted in FIGS. 5 and 7 by a respective surrounding circle. This circle is not part of the device.

A glide wheel 21 which allows a smooth gliding up of the stair climbing device abuts against the front surface of the step.

FIGS. 5 and 6 show the stair climbing device in an operational position in which the eccentric arms 10 have rotated as compared with the position in FIGS. 3 and 4 by about 30° in a clockwise direction. In this position, the housing 1 with its contact points 19 rests on the lower step. The running wheel 15 is lifted so far that the break wheel 17 has lost contact with the floor and the break lever 16 is in a position in which an unintended rotation of the running wheel 15 is blocked.

FIGS. 7 and 8 show the stair climbing device in a position in which the eccentric arms 10 are further rotated as compared with FIGS. 5 and 6. In this part of the cyclic path, the rotational speed of the driven non-circular gear wheel 5 and, accordingly, the rotational speed of the eccentric arms 10 is high. By this, the period of time between the lifting of the running wheels 15 from the lower step and the subsequent touching down of the running wheels 15 on the upper step is kept short in an advantageous manner. Since no lifting operation has to be carried out in this part, the low output torque caused by the high rotational speed does not raise any problems.

Figure 9:
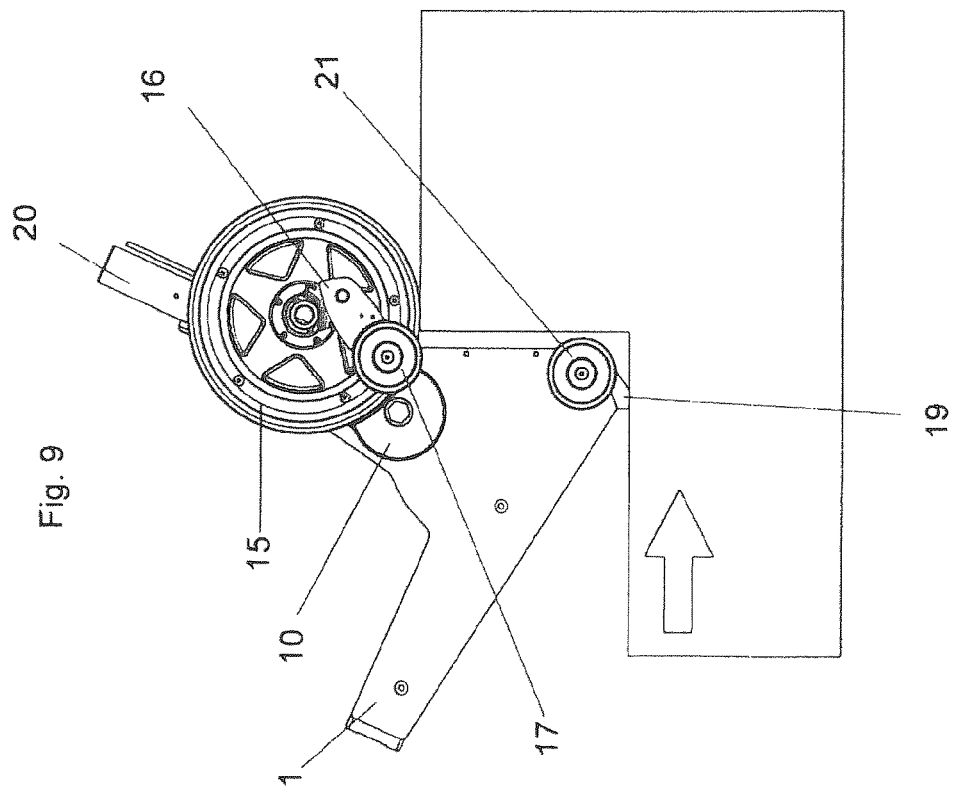
Figure 15:
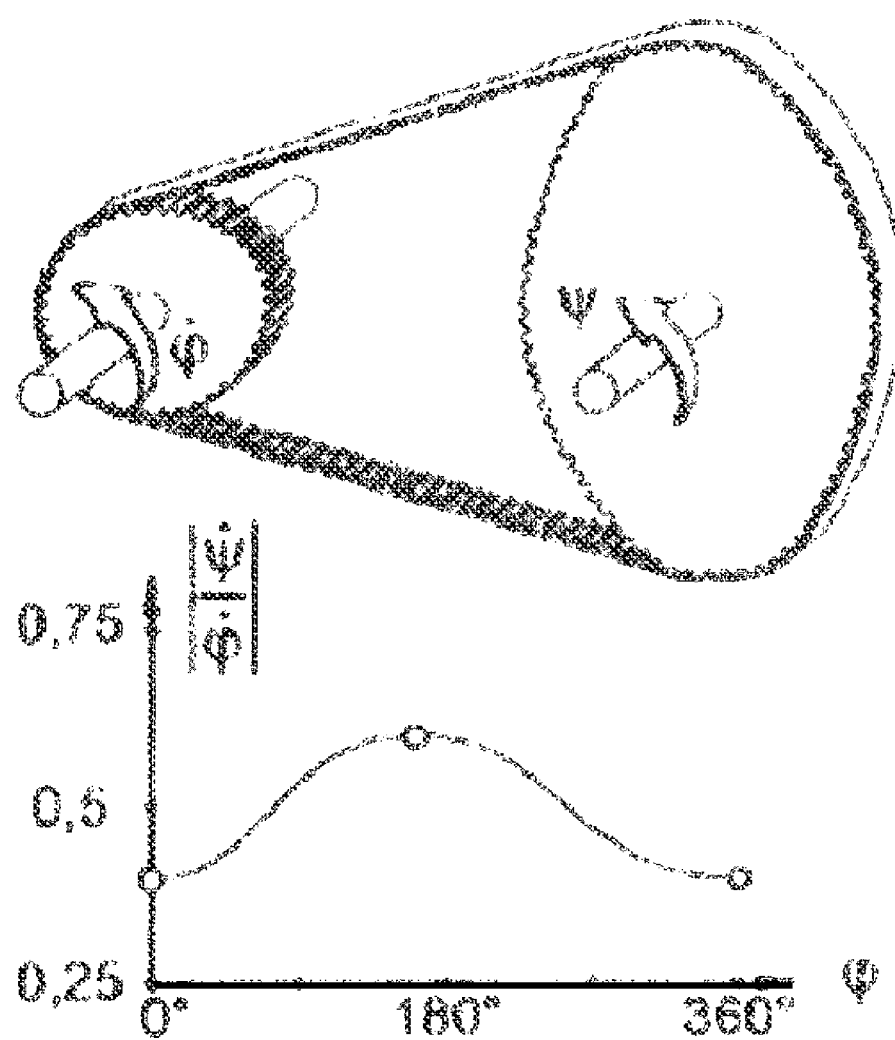
FIG. 15 is a schematical sketch of a gear transmission assembly in accordance with an exemplary embodiment implementing non-circular chain gears or non-circular belt pulleys together with a depiction of the possible variation of transmission ratio.
Figure 16:
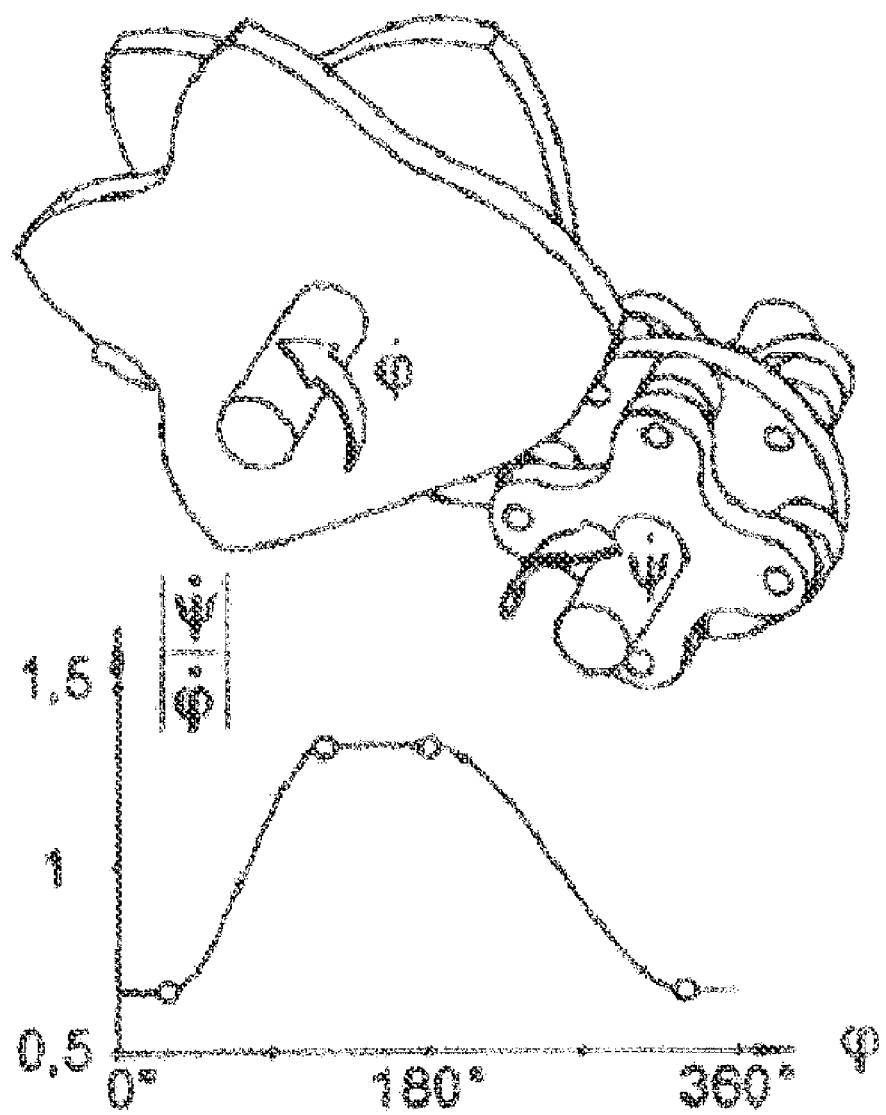
FIG. 16 is a schematical sketch of a gear transmission assembly in accordance with an exemplary embodiment implementing cams and roller stars together with a depiction of the possible variation of rotational speed.
Figure 17:
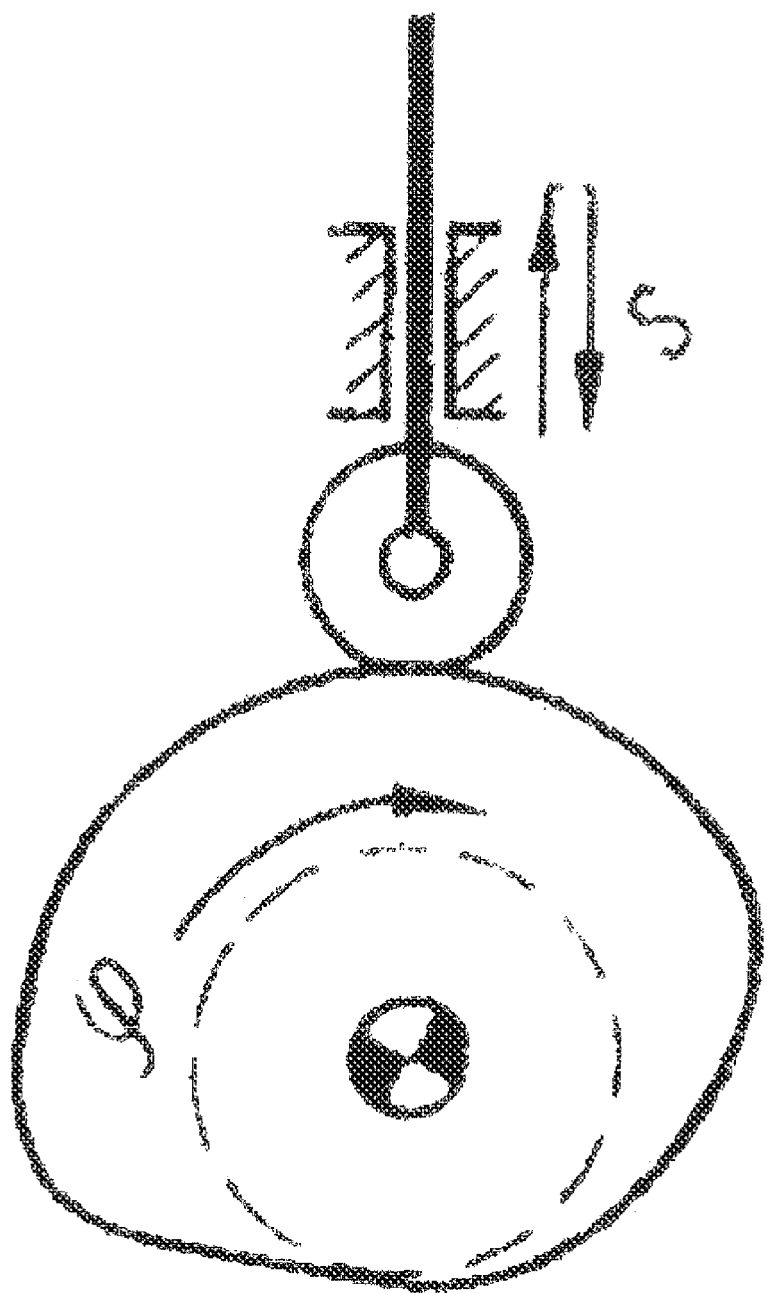
FIG. 17 is a schematical sketch of a cam gear transmission assembly in accordance with an exemplary embodiment.
Figure 18:
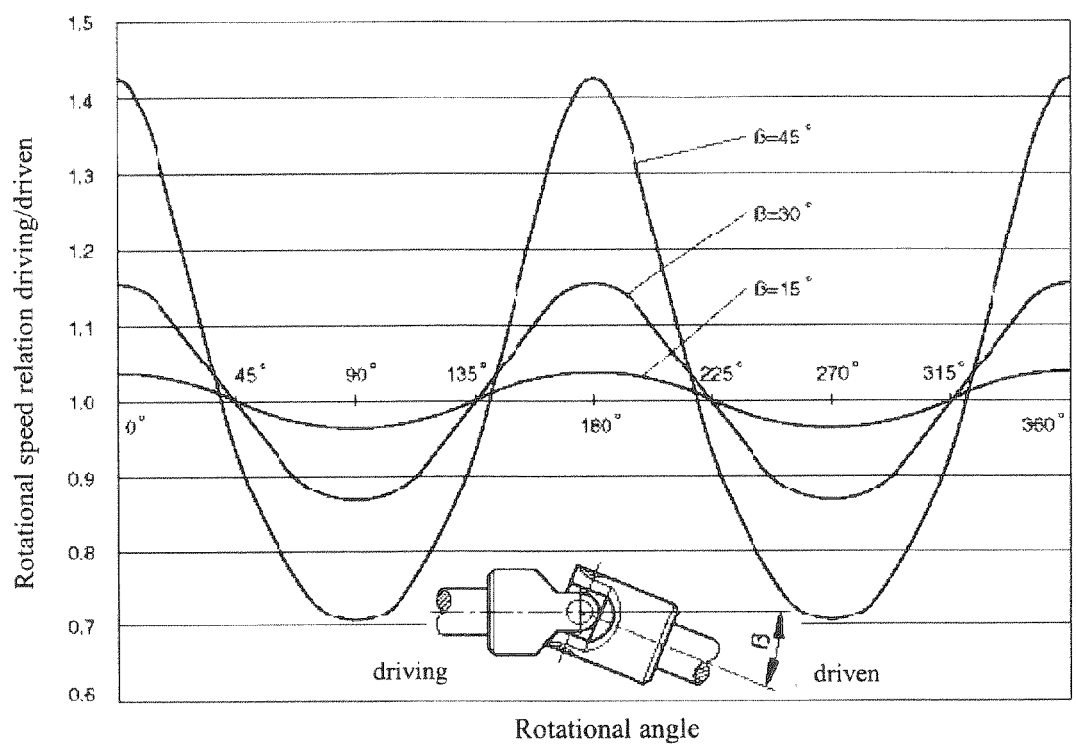
FIG. 18 is a schematical sketch of a Cardan joint together with depictions of possible variations of rotational speed depending on a rotational angle $\beta$ in accordance with an exemplary embodiment.
Figure 19:
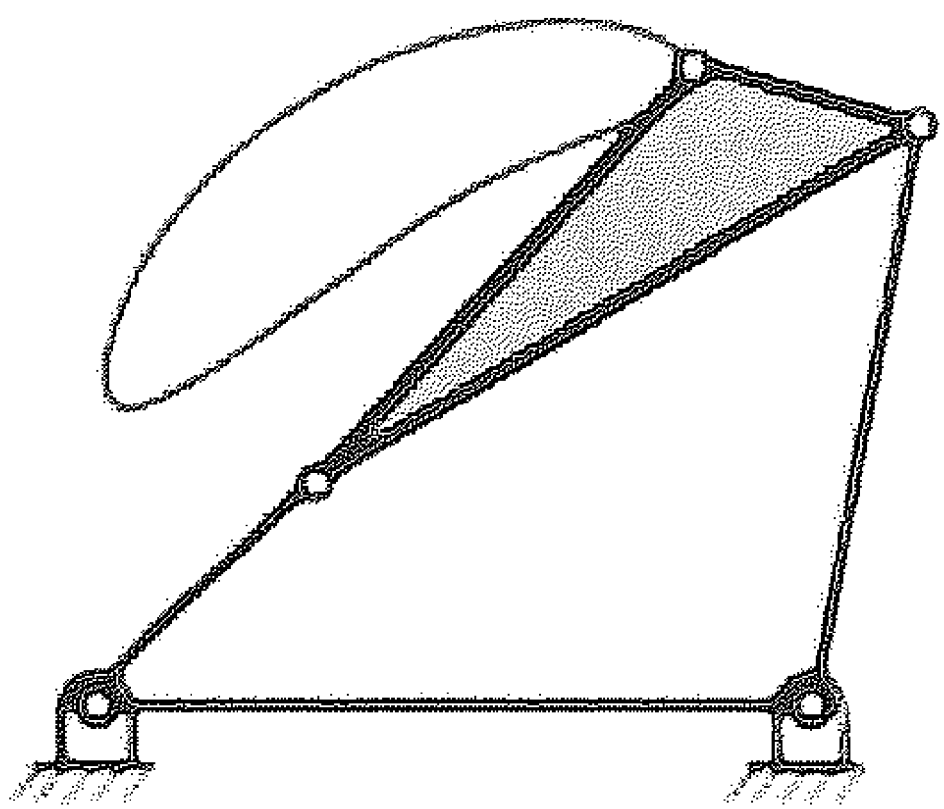
FIG. 19 is a schematical sketch of a linkage gear transmission assembly in accordance with an exemplary embodiment.
Figure 20:
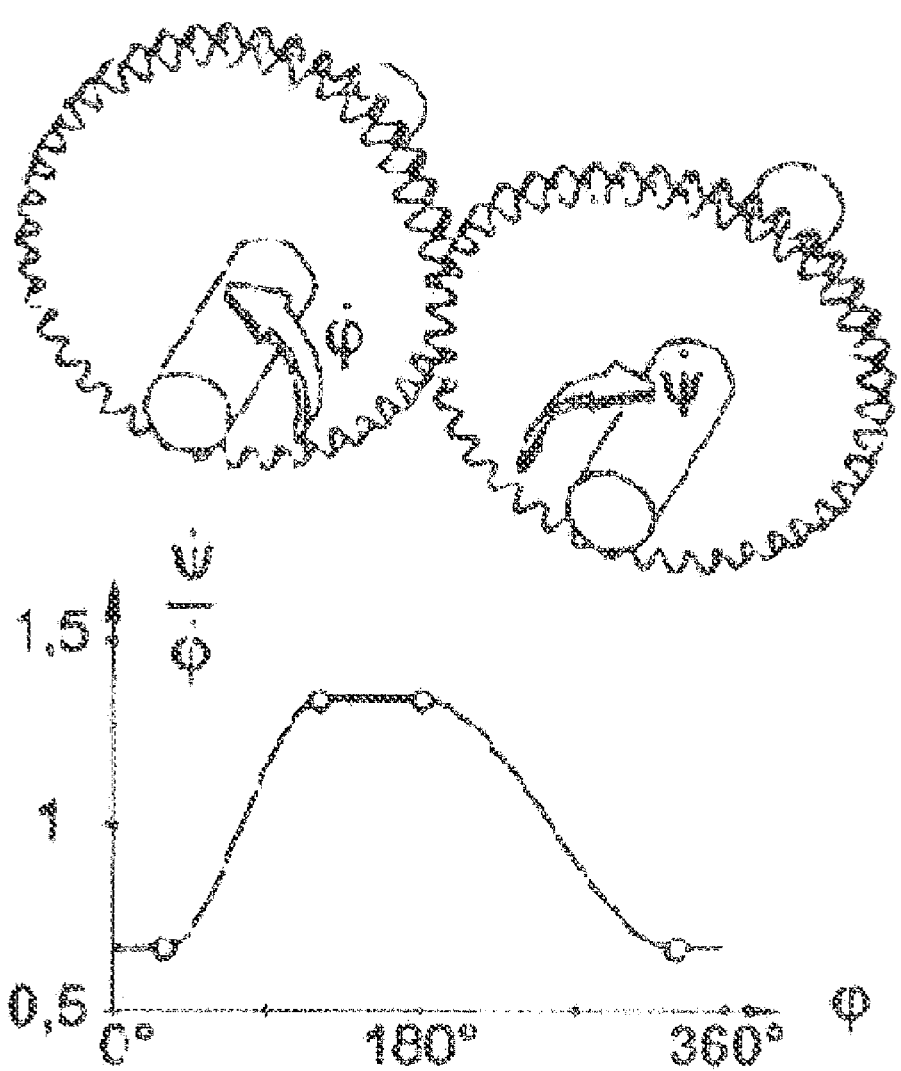
FIG. 20 is a schematical sketch of a gear transmission assembly having non-circular gear wheels together with a depiction of the possible variation in rotational speed in accordance with an exemplary embodiment.

FIGS. 9 and 10 show the position of the stair climbing device in the moment in which the running wheels 15 have just touched down on the upper step. In this position, the break wheels 17 still do not have contact with the upper step and, accordingly, the break levers 16 are still in a position in which an unintended rolling of the running wheels 15 is prevented. Accordingly, no unintended rolling of the running wheels 15 can occur. In the position shown in FIGS. 9 and 10, the rotational speed of the driven non-circular gear wheel 5 and, accordingly, of the eccentric arms 10 is slow whereby a soft and smooth touchdown of the running wheels 15 on the upper step is provided. At the same time, the low rotational speed provides a high output torque which renders possible that the lifting operation upon lifting of the housing 1 and the wheel chair attached thereto including the person sitting therein (not shown) is carried out.

FIGS. 11 and 12 show an operational position in which the stair climbing device is lifted as compared with the position in FIGS. 9 and 10. The eccentric arms 10 are in a horizontal position so that a maximum lever arm is given. Accordingly, the highest torque is required. The non-circular gear transmission assembly 3 is designed such that in this position there is a particularly low rotational speed of the driven non-circular gear wheel 5, depending on specific design even the lowest rotational speed of the output side, so that, at the same time, the highest output torque can be delivered.

FIGS. 13 and 14 show the stair climbing device in a position in which the housing 1 is completely lifted on the upper step, the breaking wheels 17 have sufficient contact with the top surface of the upper step in order to bring the break levers 16 in a position in which the running wheels 15 can be rolled and the stair climbing device can be moved to the right hand side according to the depiction in FIG. 13 in order to either climb another step (not shown) or to move away from the lower step. If the stair climbing device unintentionally or erroneously should be moved to the left hand side according to the depiction in FIG. 13, at first the break wheels 17 would be pushed over the edge of the step and would lower down which would cause the break levers 16 to take a position in which rolling of the running wheels 15 to the left hand side would be prevented.

FIGS. 15 to 20 show alternatives to the non-circular gear wheel transmission assembly 3. These alternatives are merely depicted as sketches showing principles and comprise according to FIG. 15 a chain or tooth belt gear transmission assembly having non-circular chain wheels or belt pulleys, respectively, according to FIG. 16 a cam-roller star-gear transmission assembly, according to FIG. 17 a cam gear transmission assembly, according to FIG. 18 a Cardan joint, according to FIG. 19 a linkage gear transmission assembly and according to FIG. 20 a further embodiment of a non-circular gear wheel transmission assembly.

Figure 21:
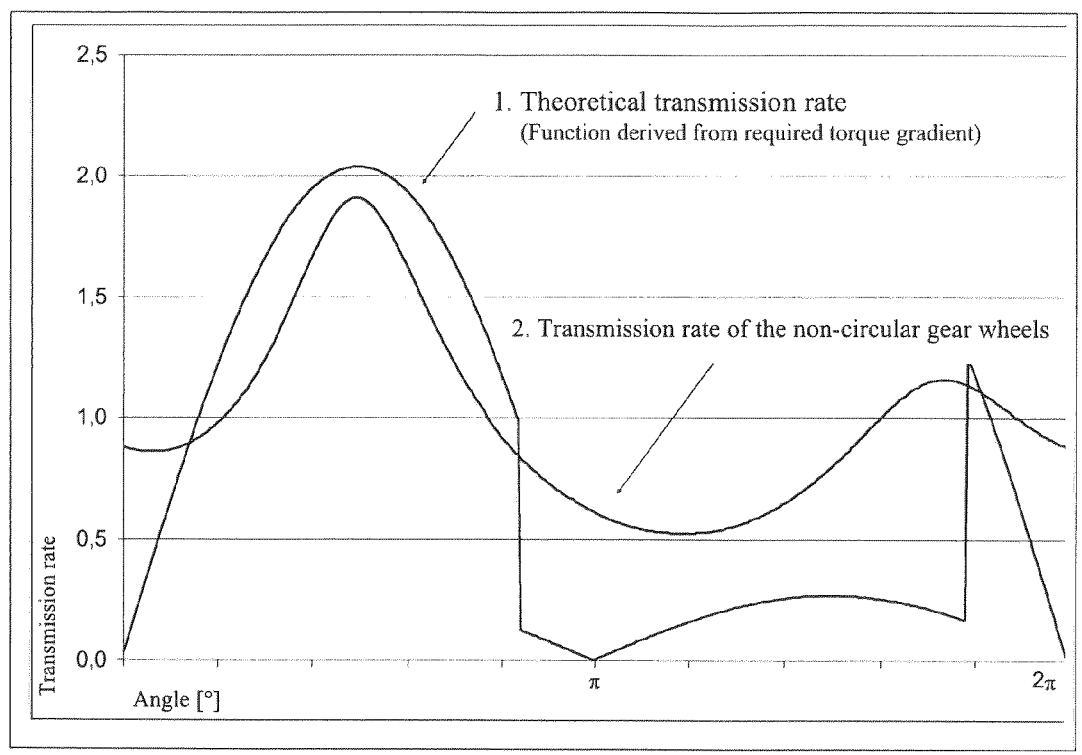
FIG. 21 shows the curves of a theoretically ideal transmission ratio and a transmission ratio which has been practically put in reality by use of a non-circular gear transmission assembly in accordance with an exemplary embodiment.

FIG. 21 shows a diagram with two curves wherein curve 1 is a transmission ratio curve which is theoretically desirable and which is derived from the required torque gradient and the desired speed gradient. Curve 2 shows the transmission ratio which is provided by the non-circular gear wheels 4, 5 of the non-circular gear wheel transmission assembly 3. Apparently, already an excellent approximation of the ideal torque gradient and rotational speed gradient is achieved. Further adaptations could be achieved with superposition of a variation of the rotational speed of the driving motor 2 carried out via an electronic control unit (not shown). It is understood that in such case the rotational speed of the drive motor 2 only has to be varied to a small degree so that no problems are caused by disadvantages which usually occur when a considerable variation of the rotational speed of the drive motor is carried out.

What is claimed is:

1. A stair climbing device comprising at least one climbing element which can be moved on a circular path so that the element can get in contact with a next step of a stair and lift or lower the stair climbing device on the next step, said stair climbing device comprising:
   a drive motor for providing a driving force for moving the at least one climbing element on the circular path, wherein the at least one climbing element is mounted on eccentric arms,
   wherein the movement of the at least one climbing element on the circular path is carried out with a non-constant rotational speed,
   wherein
   a gear transmission assembly is provided between the drive motor and the at least one climbing element, said gear transmission assembly is adapted to cyclically vary the rotational speed of the at least one climbing element with respect to the rotational speed of the drive motor, and
   wherein the at least one climbing element is implemented as a running wheel mounted on at least one of said eccentric arms.

2. The stair climbing device according to claim 1, wherein the gear transmission assembly is a mechanical gear transmission assembly.

3. The stair climbing device according to claim 2, wherein the gear transmission assembly is one of the group comprising: a Cardan joint, a linkage gear assembly, a chain gear assembly having non-circular chain wheels, a tooth belt gear assembly having non-circular belt pulleys, a cam-roller star gear assembly and a cam gear assembly.

4. The stair climbing device according to claim 1, wherein the gear transmission assembly is a non-circular mechanical gear transmission assembly.

5. The stair climbing device according to claim 4, wherein the non-circular gear transmission assembly has two non-circular gear wheels having different lines of contact or lines of action.

6. The stair climbing device according to claim 4, wherein the non-circular gear transmission assembly has two non-circular gear wheels having the same lines of action or lines of contact.

7. The stair climbing device according to claim 6, wherein the non-circular gear wheels are disposed in mirror imaged lines of action or lines of contact.

8. The stair climbing device according to claim 6, wherein the non-circular gear wheels are disposed with offset lines of action or lines of contact.

9. The stair climbing device according to claim 1, wherein the drive motor is adapted to be driven with cyclically variable rotational speed, wherein the variation of the rotational speed of the at least one climbing element caused by the variation of the rotational speed of the drive motor is superimposed on the variation of the rotational speed of the at least one climbing element caused by the gear transmission assembly.

10. The stair climbing device according to claim 1, wherein two climbing elements are provided.

11. The stair climbing device according to claim 1, wherein the stair climbing device is a stair climbing device adapted for a wheelchair.

* * * * *